United States Patent
Potucek et al.

[11] Patent Number: 5,267,053
[45] Date of Patent: Nov. 30, 1993

[54] AUTOMATIC REFERENCE CONTROL FOR IMAGE SCANNERS

[75] Inventors: Martin Potucek; Mark E. Stefanik, both of Rochester, N.Y.

[73] Assignee: Eastman Kodak Company, Rochester, N.Y.

[21] Appl. No.: 263,461

[22] Filed: Oct. 27, 1988

[51] Int. Cl.$^5$ ............................................. H04N 1/40
[52] U.S. Cl. .................... 358/446; 358/461; 358/406
[58] Field of Search ........... 358/464, 446, 443, 461, 358/213.16, 448, 455, 474, 475, 406, 163, 171

[56] References Cited

U.S. PATENT DOCUMENTS

| | | | |
|---|---|---|---|
| 3,379,826 | 4/1968 | Gray | 358/446 |
| 4,216,503 | 8/1980 | Wiggins | 358/446 |
| 4,329,717 | 5/1982 | Logie et al. | 358/446 |
| 4,408,231 | 10/1983 | Bushaw et al. | 358/446 |
| 4,486,781 | 12/1984 | Wilmer et al. | 358/461 |
| 4,567,527 | 1/1986 | Yokomizo | 358/461 |
| 4,654,723 | 3/1987 | Nagano | 358/483 |
| 4,694,353 | 9/1987 | Sato et al. | 358/455 |
| 4,760,464 | 7/1988 | Sakano | 358/461 |
| 4,806,780 | 2/1989 | Yamamoto et al. | 358/461 |
| 4,841,376 | 6/1989 | Yamamoto et al. | 358/461 |

FOREIGN PATENT DOCUMENTS 2163620A 2/1986 United Kingdom ............... 358/461

*Primary Examiner*—Edward L. Coles, Sr.
*Assistant Examiner*—Thomas D. Lee
*Attorney, Agent, or Firm*—David A. Howley

[57] ABSTRACT

A system for calibration and closed loop feedback control of image signals from charge coupled imaging devices. During periodic iterative calibration, sampling the output of dark reference cells on a CCD nets an initial D.C. restoration voltage (black) level. A white reference strip is scanned and the system gain is adjusted. The process continues until the scanned values equal the expected values, whereat the calibration process is concluded and the offset value becomes fixed for subsequent scanning. During each scan line of regular scanning, black and white signal levels are adjusted to provide full dynamic range of system operation. Dark cells are sampled and produce a voltage that is modified by the offset voltage, that was determined during calibration. The white reference strip is scanned and the system gain is adjusted.

4 Claims, 5 Drawing Sheets

AUTOMATIC REFERENCE CONTROL FOR IMAGE SCANNERS

CROSS REFERENCE TO RELATED APPLICATIONS

Reference is made to commonly assigned, copending U.S. patent application Ser. No. 263,462 entitled AUTOMATIC D.C. OFFSET CONTROL FOR IMAGE SCANNERS, filed Oct. 27, 1988 by M. E. Stefanik and M. Potucek.

1. Technical Field

This invention relates to the shaping of image signals from a photosensitive scanning array to provide a desired output signal level. More particularly, the invention relates to calibration and control of system gain functions that provide shaping of the signals from the array.

2. Background Art

Machines designed for printing document reproductions require a means for scanning an original document. Systems for scanning and reproducing image information employ devices such as charge coupled devices (CCDs). Analog output signals produced by CCDs contain a D.C. component that is attributable to the inherent operating characteristics of the CCD and a video component that is attributable to the exposure of the CCD to light. It is necessary to amplify the desired video component to an optimized reference level.

Operating characteristics, signal gain, and charge integration rates of CCDs may vary from one CCD to another, causing variable output. Further, the use of multichannel devices requires a means of balancing the outputs of the channels. Therefore, systems that employ CCDs require means for calibration and signal shaping in order for the systems to operate over an acceptable range of reflected densities.

One technique for calibration and signal shaping is taught by U.S. Pat. No. 4,216,503 entitled, "Signal Restoration and Gain Control for Image Viewing Devices". The average value of the output of CCD cells that have been charged to a potential voltage corresponding to a predetermined white level is used with the average value of scanned values from the output of dark cells to provide a system gain function that is used to amplify the CCD output signal. After determination of the gain function, the CCD output signal, for the subsequent scan, is open loop modified by the function.

U.S. Pat. No. 4,408,231 describes a method of maximizing the usable video signal by periodically scanning a white reference strip and adjusting the system gain until the output signal covers the full range of values for an analog to digital converter.

During the dynamic process of scanning, any variations in illumination intensity due to fluctuations in input power, contamination, or drifts in electronics due to thermal fluctuations, or degrading components such as L.E.D.'s or capacitors, can cause undesirable changes in the analog output of a CCD. The aforementioned techniques do not provide for adjustment of gain from one line to the next to compensate for such undesirable changes in the CCD outputs. Nor do they provide optimization of the dark level of the output signal which would increase the dynamic range of operation of the overall systems. For example, an eight-bit system has 256 possible discrete gray levels. A system that does not provide automatic offset control will have a lesser dynamic range of operation of, say, 243 gray levels, or 13 less than the same system with automatic offset control provided.

DISCLOSURE OF INVENTION

An object of the present invention is to provide improved means of controlling variations in the output of the CCDs over the full dynamic range of system operation between upper and lower limits that correspond to the limits of reflectivity, from white to black, that can be perceived by the human eye.

Another object of the present invention is to provide control of variations due to changes in illumination intensity and drifts in electronics.

According to these and other objects, the present invention provides an image signal gain control device for scanning an original image and generating a series of image signals having a video component which is characteristic of the scanned image, with a reference region of known reflectivity, means for periodically scanning the reference region to generate a measured value signal, processing means for determining from the measured value signal a gain factor required to bring the image signals to a predetermined signal level, and gain correcting means for adjusting the level of succeeding image signals in accordance with said gain factor to provide image signals closer to said predetermined signal level.

In a preferred embodiment of the present invention, the reference region is substantially white. Also, means are provided for generating a stored reference value signal having a value corresponding to the reflectivity of the reference region, and the processing means includes means for comparing the measured value signal to the reference value. Further, the measured value signal generating means includes means for averaging the values of a plurality of portions of said reference region.

In another form, the present invention provides an image signal gain control device for scanning an original image and generating succession of crosstrack line scans comprising a series of image signals having a video component which is characteristic of the scanned image, in which the control device includes a reference region of known reflectivity; means for periodically scanning the reference region at least once each crosstrack line scan to generate a measured value signal; processing means for determining from the measured value signal a gain factor required to bring the remaining image signals of the associated crosstrack scan line to a predetermined signal level; and gain correcting means for adjusting the level of succeeding image signals in accordance with said gain factor to provide image signals closer to said predetermined signal level.

In still another form, the present invention provides an image signal gain control device for scanning an original image and generating a series of image signals having a video component which is characteristic of the scanned image and a D.C. offset component, in which the control device includes means for a modifying the image signals to correct for the D.C. offset component; a reference region of known reflectivity; means for periodically scanning the reference region to generate a measured value signal; processing means for determining from the measured value signal a gain factor required to bring the image signals to a predetermined signal level; and gain correcting means for adjusting the level of succeeding image signals in accordance with the gain factor to provide image signals closer to said predetermined signal level.

In yet another form, the present invention provides an image signal gain control device having a linear array of photosensitive elements for scanning an original image and generating a succession of crosstrack line scans, each line scan producing a series of image signals having a characteristic related to the intensity of the image portion viewed by each element of the array. The control device includes a reference region of known reflectivity positioned to be viewed by at least one of the elements of the array during each crosstrack line scan to generate a measured value signal; processing means for determining from the measured value signal a gain factor required to bring the image signals to a predetermined signal level; and gain correcting means for adjusting the level of succeeding image signals in accordance with the gain factor to provide image signals closer to the predetermined signal level.

BRIEF DESCRIPTION OF DRAWINGS

The subsequent description of the preferred embodiments of the present invention refers to the attached drawings, wherein:

FIG. 4 is a logic flow chart for the embodiment of FIG. 1a;

BEST MODE FOR CARRYING OUT THE INVENTION

Figure 1A:
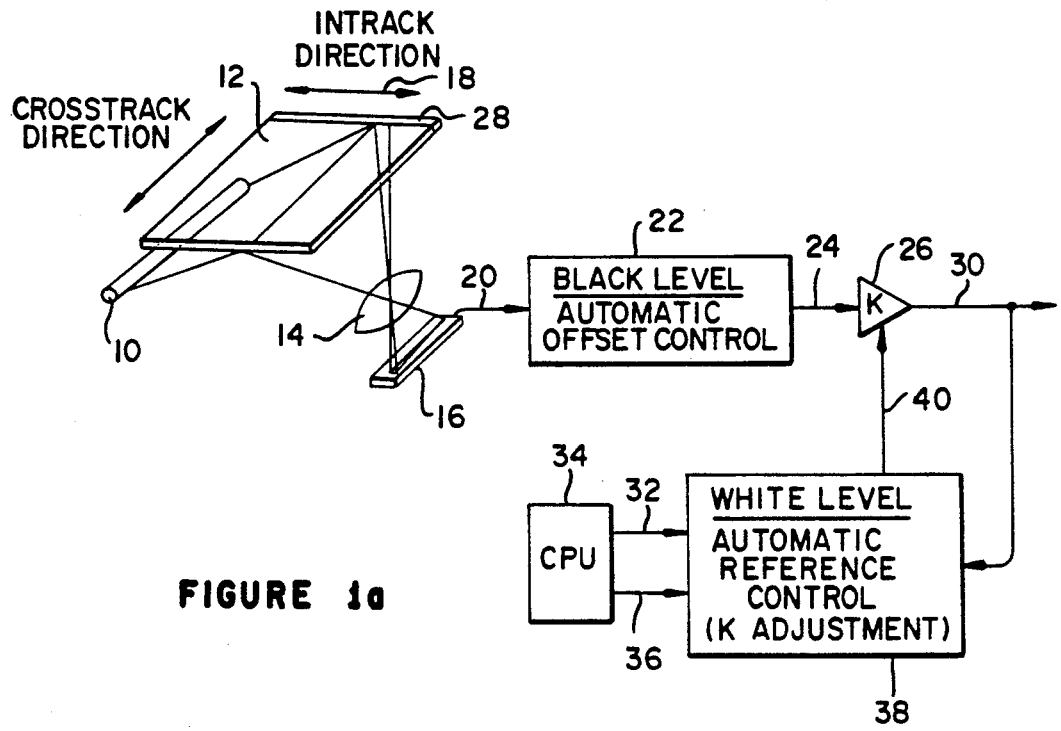
FIG. 1a is a schematic of a preferred embodiment of the present invention including an automatic reference control.

In the scanning device of FIG. 1a, a light source 10 illuminates an original document on top of a platen surface 12. Light is reflected from the original document, through a Tensing means 14 onto a charge coupled device (CCD) 16.

The analog output voltage "V(t)" of a CCD that is exposed to light intensity "I" for a fixed interval of time "T" is linear to the intensity of the light to which the CCD is exposed, as expressed by the following equation:

$$V(t) = KITt$$

where:
V(t) = the voltage of a photo receptive element;
K = a proportionality constant;
I = the light intensity at the photo receptive surface;
t = time; and
T = a fixed time of exposure.

In the case where the light that exposes the CCD is reflected, the CCD output voltage is linear to the reflectivity of the surface that the light is reflecting from.

The document is scanned in an intrack direction 18 to cause reflected light from different areas of the original to become focused on the CCD, which serves as an image system to convert the image of the original document to a series of electronic image signals 20. Since CCD output signals 20 are analog with a D.C. offset component that is characteristic to the device, it is necessary to restore the output signals to a known D.C. level, from which the video signal is referenced. During each scan line "dark reference cells" on the CCD are sampled and the voltage from the sampling is subtracted from signal 20 by an automatic offset control 22 described in detail in my commonly assigned, co-pending U.S. patent application entitled Automatic D.C. Offset Control for Image Scanners. The output 24 of automatic offset control 22 is a D.C. restored signal which is input to an adjustable gain amplifier 26.

At the start of each scan line, a white reference strip 28, having a known reflectivity, is scanned and produces a set of picture element signals from the CCD. During scanning of white intrack reference strip 28, amplified signals 30, a control signal 32 from a CPU 34, and a reference value 36 from the CPU are received by an automatic reference control 38 for adjustment of the gain of amplifier 26. Reference value 36 is a stored value which is expected from scanning white strip 28.

Within automatic reference control 38, a comparison is made between expected reference value 36 and measured value 30. If measured value 30 differs from expected value 36, a signal 40 is sent from automatic reference control 38 to amplifier 26 to adjust the amplifier gain, thereby closing the feedback loop of the system to compensate for system changes and to maintain the proper white level of the signal. After completion of signal shaping, the rest of the line is scanned.

Figure 2:
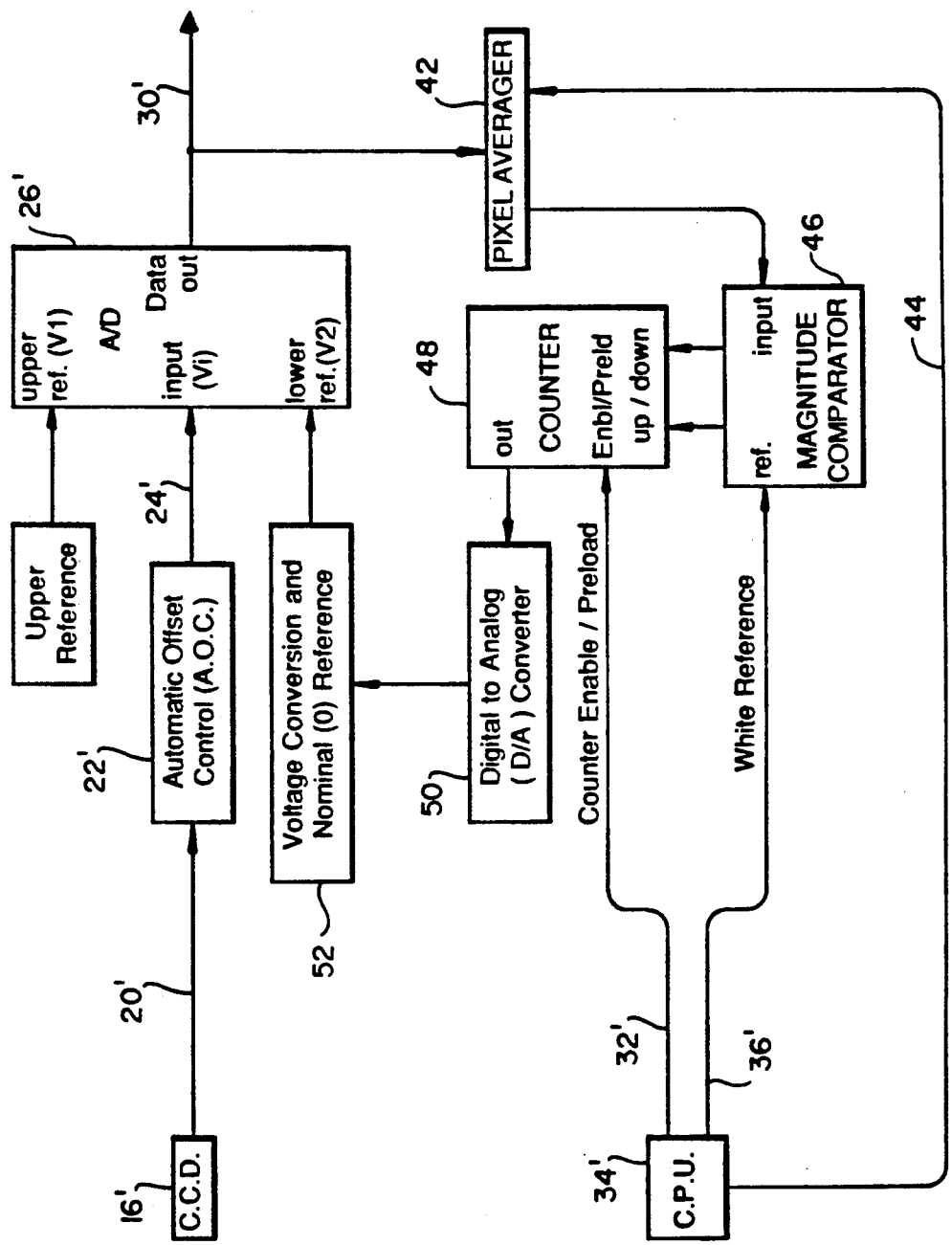
FIG. 2 is a more detailed schematic of an embodiment of the present invention including an automatic reference control.

FIG. 2 is a preferred embodiment of the system of FIG. 1a which uses the properties of an analog to digital converter 26' as the adjustable gain amplifier 26 of FIG. 1a. CCD output restored signal 24' is input to analog to digital converter 26' which has a fixed upper reference voltage $V_1$ and an adjustable lower reference voltage $V_2$. Parallel output signal 30' is input to conventional averaging circuitry 42, which is enabled by signal 44 from CPU 34' for a predetermined number, such as sixteen, consecutive pixels.

The average value of the measured pixel values is input to a magnitude comparator 46, which is also sent expected reference value 36'. A counter 48, which is enabled and preloaded with a medium value by enable/preload signal 32', counts up to increase, or down to decrease the final gain. The output value from counter 48 is input to a current digital to analog converter 50. Analog current output from digital to analog converter 50 is converted to lower reference voltage $V_2$ by a circuitry 52 as the means for changing the gain of converter 26'.

Figure 3:
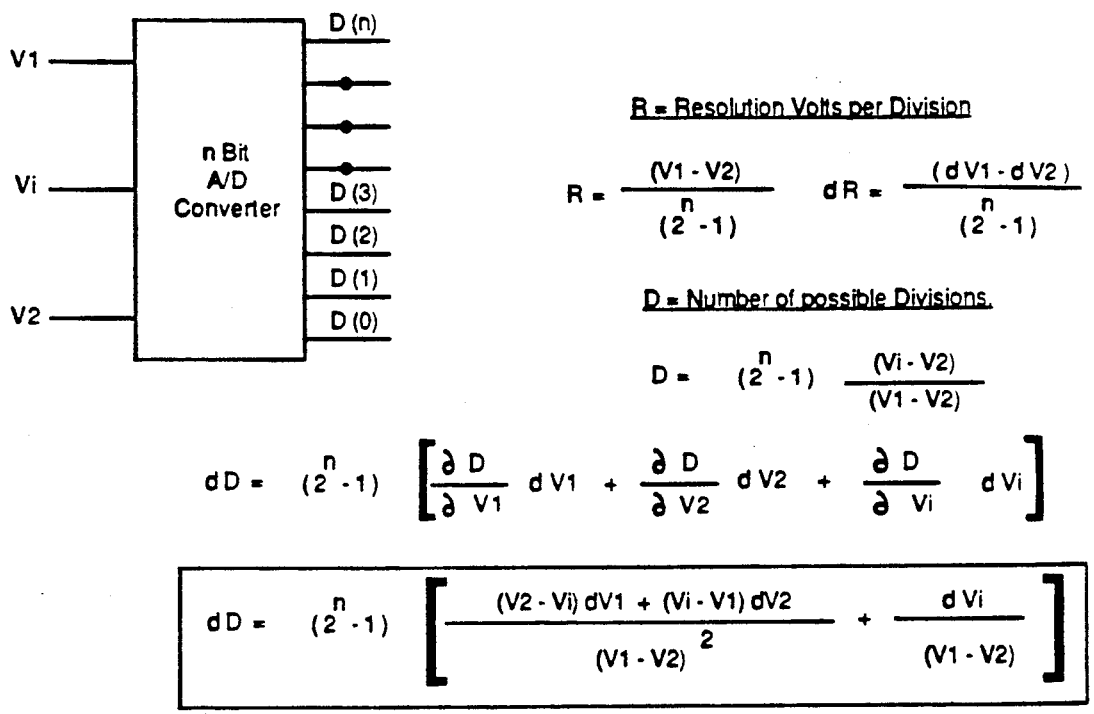
FIG. 3 shows mathematical relationships that are applicable to the automatic reference control.

Changes in a decimal equivalent "D" of a binary coded output of analog to digital converter 26' are generally nonlinear to changes in applied reference voltages "$V_1$" and "$V_2$". However, for fixed reference voltages, the decimal equivalent of a flash analog to digital converter output is linear to changes in an input voltage "$V_i$". For further details, see the mathematical relationships given in FIG. 3.

Figure 4:
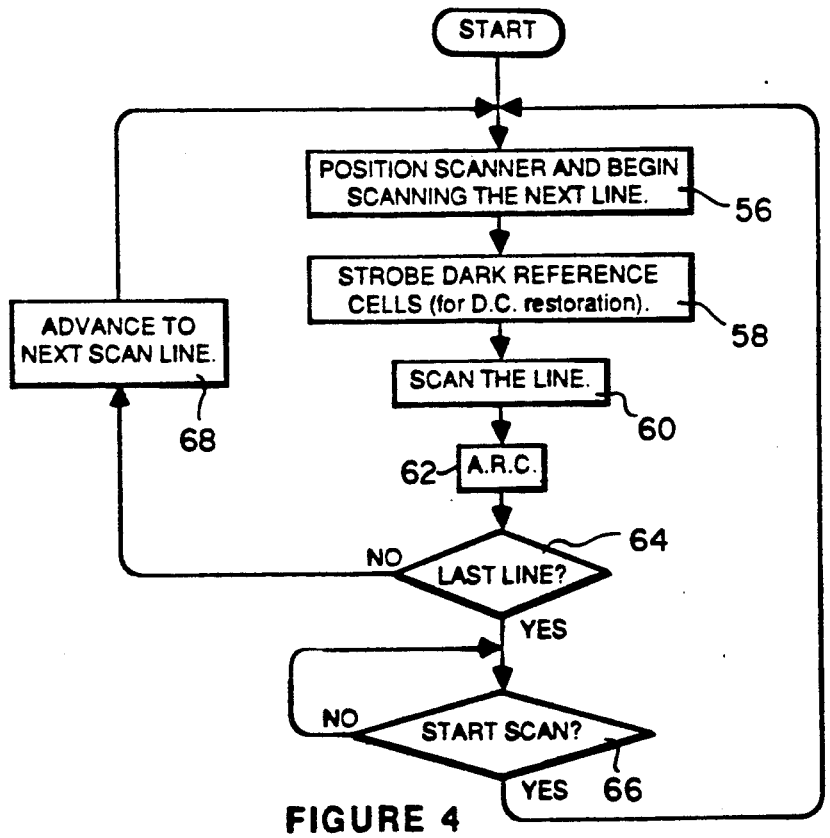

FIG. 4 is a flow chart that defines the overall system concept of the invention for the case where the intrack reference strip is located on the rear portion of the platen surface as viewed in FIG. 1a. From start, in block 56, the scanner is positioned and begins scanning the next line, which in the initial case is the first line of the calibration procedure. During block 58 of the algorithm, the CPU samples the output from dark reference cells of the CCD. From the sampled outputs, the voltage is generated that is used as an initial D.C. restoration level signal that is subtracted, by automatic offset control 22 (FIG. 2), from CCD output signal 20. The algorithm moves to block 60, wherein the scan of the current line is completed, up to the point of scanning reference strip 28. In block 62 of the algorithm, automatic reference control 38 performs its function to modify the gain of amplifier 26 based upon the aforementioned measured and expected values.

The algorithm moves to decisional block 64 wherein it is determined if the last line has been scanned. If so, the algorithm moves into and remains at a decisional block 66 while awaiting a command to start a new scan. When the command to start scan is received, the algorithm moves to block 56 for positioning, to block 58 for dark cell readings, to block 60 for scanning, to block 62 to set the amplifier gain, and into decisional block 64. If there are more lines to scan, the algorithm moves to block 68 for advancing the scan line before beginning the normal scan sequence blocks 56, 58, 60, 62, 64, and 68 until the last scan line is completed.

Figure 1B:
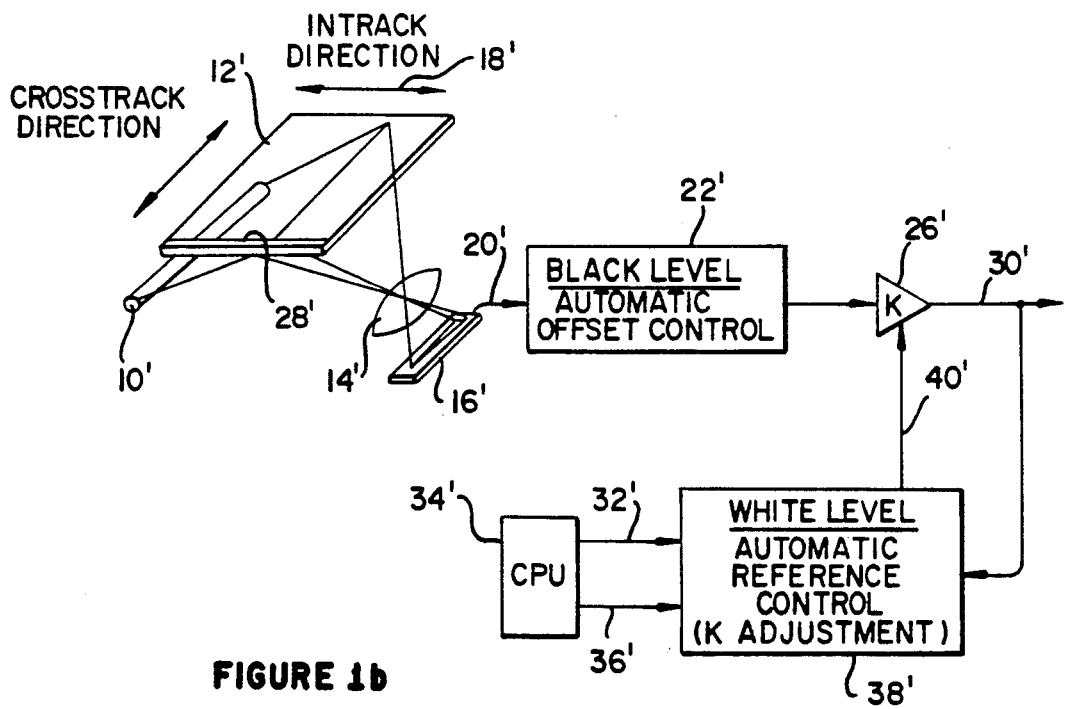
FIG. 1b is a schematic of another preferred embodiment of the present invention including an automatic reference control.
Figure 5:
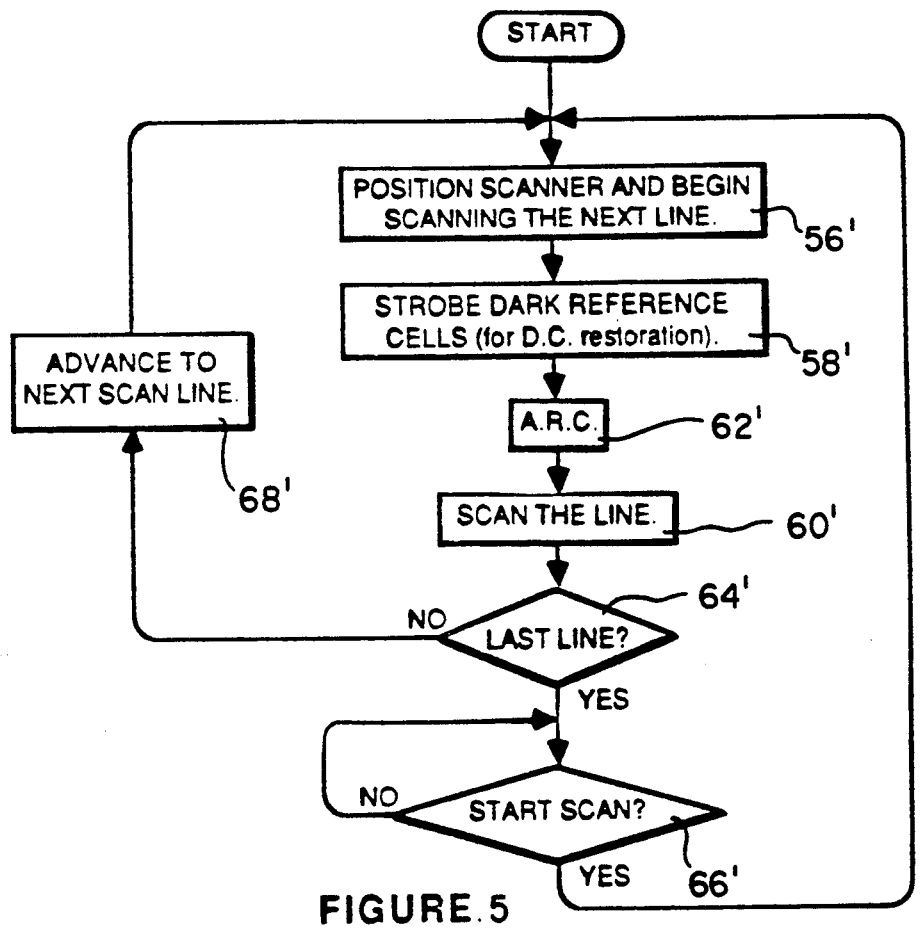
FIG. 5 is a logic flow chart for the embodiment of FIG. 1b.

FIG. 5 is a flow chart of a second embodiment shown in FIG. 1b that defines the overall system concept of the invention for the case where the intrack reference strip is located on the front portion of the platen surface. This algorithm consists of all of the blocks from the algorithm of FIG. 4, arranged in different order. The normal scan sequence is: 56', 58', 62', 60', 64', 68'.

Figure 6:
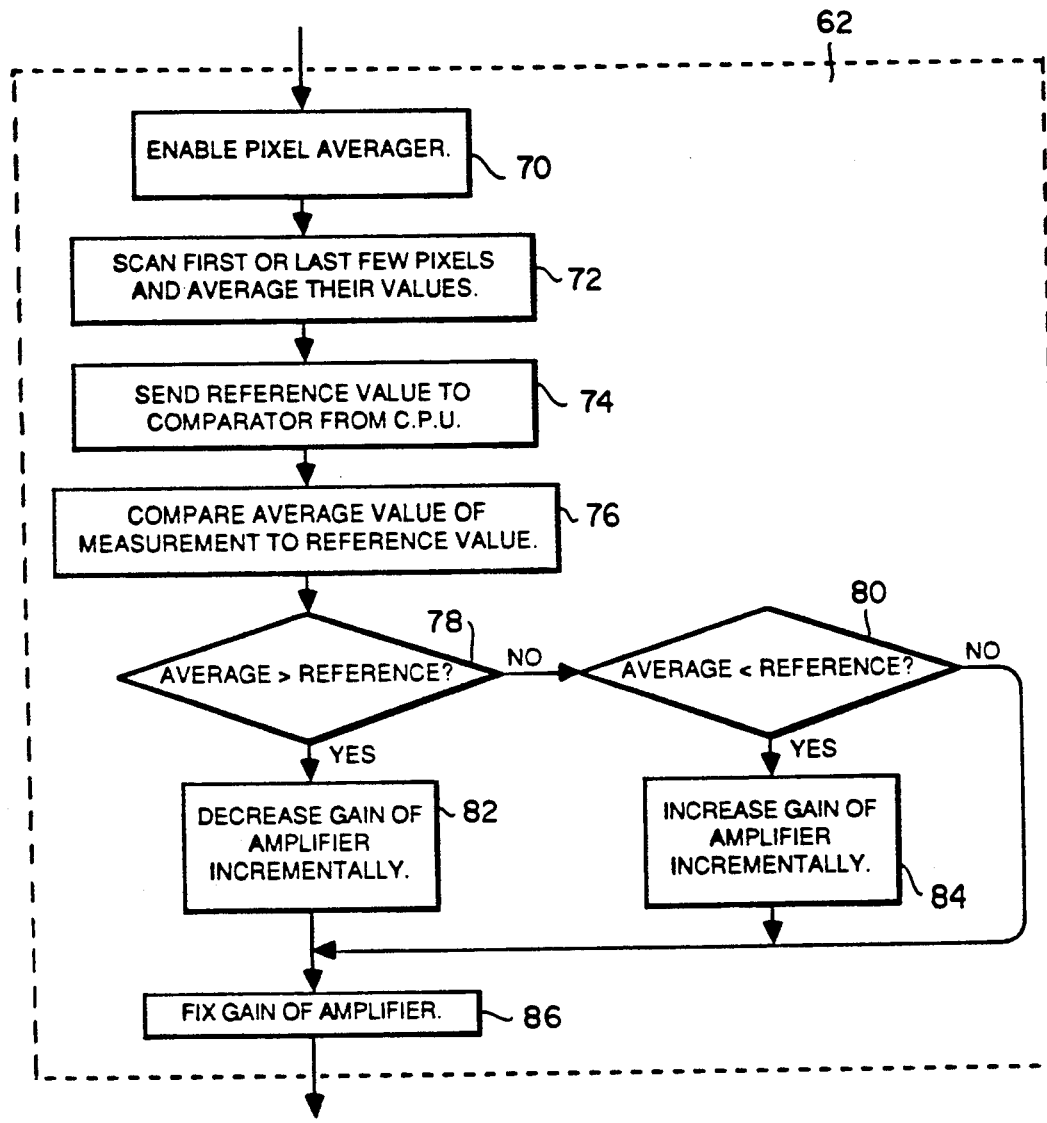
FIG. 6 is a logic flow chart for the automatic reference control.

FIG. 6 is a logic flow chart of the automatic reference control functional concept. The algorithm enters block 70 whereat hardware for averaging the values of a predetermined number of pixels is enabled at such a time as the scanned pixels correspond to white intrack reference strip 28 of FIG. 1a. The algorithm moves to block 72 for scanning the pixels. In block 74 the CPU sends a reference value, representing the value that is expected from scanning the reference strip, to a comparator. During block 76 a magnitude comparator compares the measured value of the scan to the expected value from the CPU. As the algorithm moves into blocks 78, 80, 82 and 84, a counter is clocked either up or down, from a preloaded middle value, such as for example, one hundred twenty-eight (128) in the case of an eight-bit data buss. When the algorithm goes into block 86, the latched output from the counter, which is input to a digital to analog converter whose output sets a reference voltage on an analog to digital converter, changes and fixes the gain of the CCD output signal. This completes the automatic reference control adjustment for the present scan line.

The invention has been described in detail with particular reference to preferred embodiments thereof, but it will be understood that variations and modifications can be effected within the spirit and scope of the invention.

What is claimed is:

1. An image signal gain control device having an array of photosensitive elements for scanning an original image and generating a series of image signals in response thereto, each of said image signals having a potential characteristic of the image portion viewed by the associated elements, said control device comprising:
   adjustable gain means for amplifying the image signals, wherein said amplifier means comprises an analog to digital converter with a fixed and an adjustable reference voltage;
   a reference region of known reflectivity positioned to be viewed by only a portion of the photosensitive elements to generate a measured value signal;
   means for comparing the measured value signal to a signal having a predetermined expected value corresponding to the reflectivity of the reference region; and
   means for adjusting the gain of said amplifying means in response to any difference between the measured value signal and the predetermined expected value signal.

2. An image signal gain control device as defined in claim 1 wherein said gain adjusting means comprises:
   means for averaging the measured value signal; and
   means for changing the adjustable reference value depending on the sign of the comparison between the average measured value signal and the predetermined expected value signal.

3. An image signal gain control device having an array of photosensitive elements for scanning an original image and generating a series of image signals in response thereto, each of said image signals having a potential characteristic of the image portion viewed by the associated elements, said control device comprising:
   adjustable gain means for amplifying the image signals;
   a reference region of known reflectivity positioned to be viewed by only a portion of the photosensitive elements to generate a measured value signal;
   means for comparing the measured value signal to a signal having a predetermined expected value corresponding to the reflectivity of the reference region, wherein said comparing means includes means for averaging the measured value signal, and a counter clockable up and down from a predetermined middle value depending on the sign of the comparison between the average measured value signal and the predetermined expected value signal; and
   means for adjusting the gain of said amplifying means in response to any difference between the measured value signal and the predetermined expected value signal.

4. An image signal gain control device having an array of photosensitive elements for scanning an original image and generating image signals in response thereto, said image signals each being comprised of an image potential characteristic of the image portion viewed by said elements, said control device comprising:
   adjustable gain means for amplifying the image signals;
   a reference region of known reflectivity which is viewed by only a portion of the photosensitive elements to generate a measured value signal;
   means for averaging the measured value signals of the photosensitive elements which view the reference region;
   means for comparing the averaged measured value signals to a signal having a predetermined expected value corresponding to the reflectivity of the reference region; and
   means for adjusting the gain of said amplifying means in response to any difference between the averaged measured value signals and the predetermined expected value signal.

* * * * *